United States Patent [19]

Fujiwara

[11] 4,408,626
[45] Oct. 11, 1983

[54] VALVE SEAT ASSEMBLY FOR A STEAM TRAP

[75] Inventor: Katsuji Fujiwara, Kakogawa, Japan

[73] Assignee: TLV Co., Ltd., Tokyo, Japan

[21] Appl. No.: 308,563

[22] Filed: Oct. 5, 1981

[30] Foreign Application Priority Data

Oct. 8, 1980 [JP] Japan .............................. 55-141224
Nov. 4, 1980 [JP] Japan .......................... 55-158431[U]

[51] Int. Cl.³ .............................................. F16T 1/30
[52] U.S. Cl. .................................. 137/185; 137/429; 251/359
[58] Field of Search ............... 137/185, 202, 192, 409, 137/429; 251/359

[56] References Cited

U.S. PATENT DOCUMENTS 1,856,451  5/1932  Armstrong ........................... 137/185
4,300,588 11/1981  Fujiwara .............................. 137/185

*Primary Examiner*—Alan Cohan
*Attorney, Agent, or Firm*—Toren, McGeady and Stanger

[57] ABSTRACT

A steam trap including a buoyant float member is equipped with a valve seat assembly which is closed by abutment of the float with a valve seat portion surrounding the flow orifice. The assembly is formed with a float abutment member made of carbide located adjacent the valve seat surface on the outer periphery thereof and located to serve as a contact point for the float member and to define a fulcrum about which the float may pivot when moving into and out of contact with the valve seat surface. The material of the float abutment member ensures a longer service life and a more secure closure of the flow orifice.

7 Claims, 6 Drawing Figures

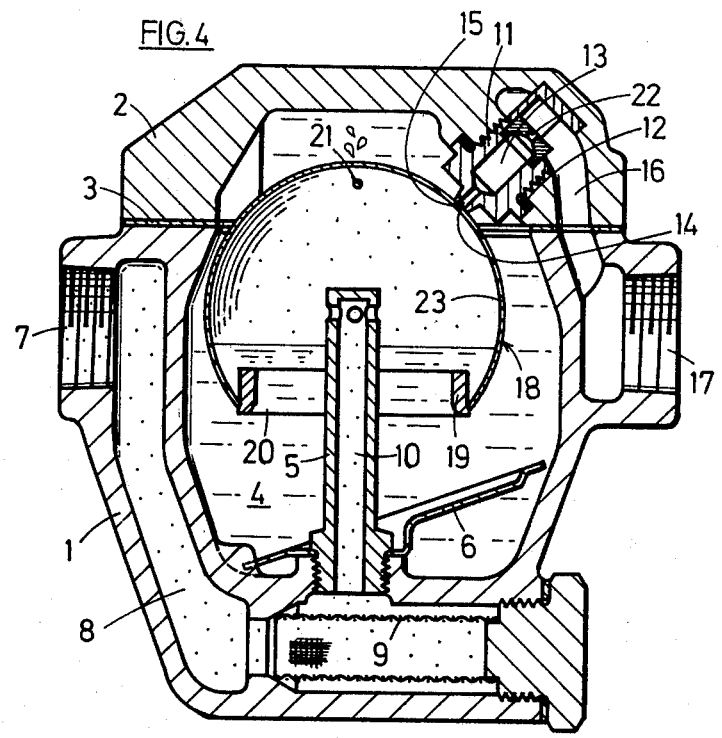
FIG. 4
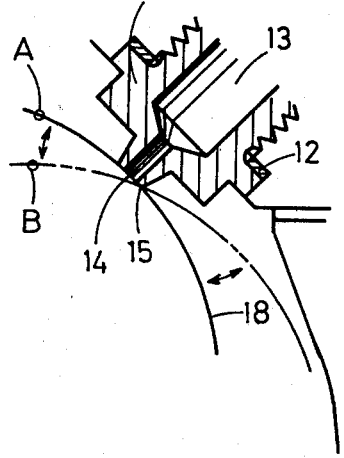
FIG. 5
FIG. 6

VALVE SEAT ASSEMBLY FOR A STEAM TRAP

The present invention relates generally to steam traps and more particularly to a valve seat assembly therefor. More specifically, the invention is directed toward the structure of a valve seat assembly which permits contact with a buoyant float without undue wear of the parts of the seat assembly contacted by the float.

Fluid control valves of the type to which the present invention relates adapted for use as steam traps generally involve a free-floating float located within a valve chamber. A valve seat assembly defines an outlet orifice through which condensate may escape and the float closes the orifice by being brought in direct contact with a valve seat surface surrounding the orifice so that the outer surface of the float covers the orifice.

Usually, the valve seat assembly is provided with a valve bore extending through the seat assembly and having the orifice defined at one end thereof. When buoyant forces in the steam trap cause the float to be elevated, the outer surface thereof will come into contact with the seat area or surface surrounding the orifice and during movement of the float into and out of contact with the seat surface, the float will tend to pivot about an abutment point which acts as a fulcrum for the float.

However, as a result of repeated contact between the float and the seat area surrounding the outlet orifice, a depression or concavity may tend to develop in the seat area surrounding the orifice which is to be opened and closed. As a result, when the seat area tends to become worn and when such wear extends to the periphery of the flow orifice, the depression which is thus formed may operate to prevent the surface of the float from completely closing the flow orifice.

As a result, malfunctioning of the steam trap may occur and secure closure of the outflow orifice by the float may be prevented.

Accordingly, the present invention is directed toward providing a steam trap having a valve seat assembly which is structured to reduce wear on an outer peripheral portion of the valve seat surface thereof at which a float body comes into contact during opening and closing of the flow orifice thereof and which serves as a fulcrum point for the float.

SUMMARY OF THE INVENTION

Briefly, the present invention may be defined as a valve seat assembly for a steam trap which includes a housing having an interior wall defining a valve chamber, a valve seat assembly mounted in the housing and defining a valve orifice in flow communication with the valve chamber and a buoyant float member movably mounted within the valve chamber and adapted to be brought into and out of engagement with the valve seat assembly to close and open the valve orifice. The valve seat assembly of the invention comprises a body portion made of stainless steel mounted within the housing and defining a valve bore having the valve orifice defined at the inner end thereof, a valve seat surface defined contiguously with and surrounding the valve orifice and a float abutment member made of carbide located adjacent the valve seat surface on the outer periphery thereof, the float abutment member being located to serve as a contact point for the float member and to define a fulcrum about which the float may pivot when moving into and out of contact with the valv seat surface.

In the operation of the device of the present invention, when the float moves to close the valve orifice, it is brought into contact with the float abutment member which is made of carbide along the valve seat surface located on the outer peripheral portion of the valve orifice. As the float comes into contact with the float abutment member, it swings about this portion as a fulcrum and it seats itself to close the circular edge of the valve orifice.

Therefore, the float member operates to pivot about the abutment member which is made of carbide and which operates as a fulcrum so that sliding contact of the float member occurs along that portion of the valve seat assembly which is made of carbide. Carbide displays favorable wear-resistant characteristics as compared with stainless steel and, as a result of the structure of the invention, the parts of the seat assembly through which the fluid flow occurs will be made of stainless steel, while the parts which are in abutment or abrasive contact with the float are made of carbide thereby to reduce wear.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE DRAWINGS

In the drawings:

FIG. 4 is an overall sectional view showing the steam trap including the valve seat assembly in accordance with the invention;

FIG. 5 is a detailed sectional view of a steam trap assembly wherein there is depicted the manner in which the float member moves relative to the valve seat assembly; and FIG. 6 is a plan view showing the valve seat surface and the flow orifice and depicting the wear which may occur as a result of engagement of the float member therewith.

DETAILED DESCRIPTION OF THE PREFERRED EMBODIMENTS

Figure 1:
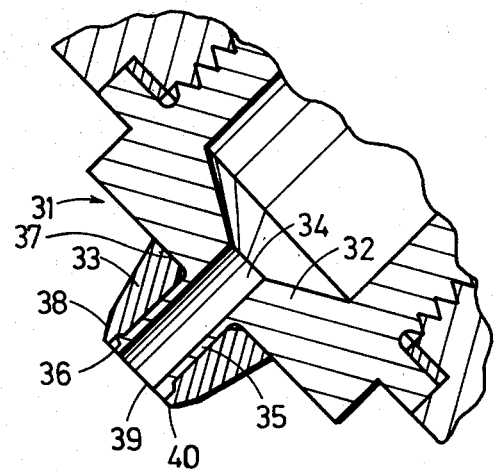
FIG. 1 is a detailed sectional view showing the parts of a valve seat assembly structured in accordance with a first embodiment of the present invention.

In order to provide a better understanding of the embodiments of the present invention depicted in FIGS. 1, 2, and 3 and the manner in which the valve seat assembly of the invention cooperates with other parts of a steam trap assembly, reference will first be made to FIG. 4 wherein there is shown the overall structure of the steam trap including a valve seat assembly which defines an orifice adapted to be opened and closed by a buoyant float member.

As shown in FIG. 4, the steam trap assembly includes a housing or body portion 1 and a cover member 2 which are joined together with a hermetically tight seal by a gasket 3 located therebetween. The housing 1 defines a valve chamber 4 and an inlet tube 5 is installed at the center of the valve chamber 4 and extends vertically therein from the bottom of the valve chamber.

A bottom plate 6 is mounted at the lower portion of the valve chamber, with the plate 6 having an inclined orientation. The bottom plate 6 is affixed between the inlet tube 5 and a portion of the housing 1 defining the bottom part of the valve chamber 4 and the inlet tube 5 is threadedly engaged into the housing 1 in order to thereby also mount the bottom plate 6.

An inlet orifice 7 is arranged to communicate with the valve chamber 4 through an inlet passage 8, a strainer 9, and an inlet bore 10 of the inlet tube 5.

A valve seat assembly 11 is installed at the upper region of the valve chamber 4 in tight, sealed engagement with the cover 2. A gasket 12 is inserted between the assembly 11 and the cover 2 and the valve seat assembly 11 is threadedly engaged in the cover 2 in an arrangement whereby the central axis of the seat assembly 11 extends at an angle of 45° to the horizontal. The valve seat assembly includes a portion made of stainless steel having a bore with a valve orifice 14 defined at one end of the bore. An intermediate chamber 13 is defined at the opposite end of the bore with a diameter which is larger than the diameter of the valve orifice 14. At the outer end of the intermediate chamber 13 is inserted a member which defines an orifice 22 having a diameter which is approximately to the diameter of the valve orifice 14.

The inner end portion of the valve assembly 11 which surrounds the valve orifice 14 extends into the valve chamber 4 with a conical configuration. The inner end thereof forms a valve seat surface 15 which has an annular configuration surrounding the opening at the inner end of the valve bore at which the valve orifice 14 is located.

The valve chamber 4 is in flow communication with an outlet 17 through a flow path including the valve orifice 14, the intermediate chamber 13, the orifice 22, and an outlet passage 16.

Located within the valve chamber 4 is an inverted bucket float 18 having an open bottom which is located to be freely movable within the valve chamber 4. The bucket float 18 is made of stainless steel and has a spherical shell at the upper part thereof. The lower part of the float 18 has an opening which is defined by a mouthpiece 19 having a generally annular configuration defining a circular opening 20 at the bottom of the float 18. The mouthpiece 19 is weighted in order to effect a lowering of the center of gravity of the bucket float to a point below the center of the spherical shell 23. The inlet tube 5 extends into the interior of the bucket float 18 through the inlet opening 20 and a small hole 21 is provided at the top of the bucket float 18.

FIG. 4 shows the steam trap in the closed condition. With the steam trap as shown in FIG. 4, no condensate flows through the inlet 7 and steam supplied from the inlet 7 flows through the inlet passage 8 and the inlet bore 10. Part of the steam within the bucket 18 will condense and another part will escape outwardly of the bucket through the small hole 21. However, the steam losses resulting therefrom are generally very small in quantity and thus, as long as steam is supplied, the bucket float 18 will remain in the raised position due to buoyancy imparted thereto by the steam within the float. At this time, the outer surface of the bucket float 18 will be in contact with the valve seat surface surrounding the valve orifice 14 thereby closing the valve orifice.

When condensate formed in the steam equipment to which the steam trap is fitted flows into the inlet 7 stopping the steam supply to the interior of the bucket 18, the valve trap will start to open. The quantity of steam in the bucket 18, as mentioned above, decreases gradually due to condensation and due to escape through the small hole 21. Consequently, the buoyancy force exerted on the bucket 18 will also gradually decrease.

When the buoyant force decreases to a predetermined value, the bucket float 18 will roll counterclockwise about a fulcrum located at a point below the valve orifice 14 on the valve seat surface 15. The movement of the float is depicted in FIG. 5 and, as shown therein, the float will move from a position A shown in solid line to a position B shown in two-dot chain line.

As the clearance between the outer surface of the float 18 and the valve seat surface 15 increases, the fluid pressure urging the bucket 18 toward the valve orifice will gradually decrease and, accordingly, the bucket will leave the valve seat surface 15 and after rolling to some extent will completely open the valve orifice 14 and move downwardly in the valve chamber 4.

When the float 18 reaches the bottom of the valve chamber 4, it will rest upon the bottom plate 6 and the circular bottom of the mouthpiece 19 will be facing downwardly and will be in an inclined position. Condensate in the valve chamber 4 will be discharged to the outlet 17 through the valve orifice 14, the intermediate chamber 13, the orifice 22, and the outlet passage 16.

When the condensate at the steam trap inlet side has been discharged, steam is again supplied to the interior of the bucket 18 through the inlet passage 8 and the inlet bore 10. With increasing quantity of steam in the bucket, the buoyancy force exerted thereon will again increase causing the bucket to float and move upwardly. Since the bucket 18 was resting on the inclined bottom plate 6, the bucket will begin to float from its inclined position, and it will change its position during the floating movement until it finally moves into an almost upright position with its inlet opening 20 facing downwardly as shown in FIG. 4. This type of movement of the float occurs because the center of gravity of the bucket is biased downwardly toward the inlet 20 by the weight of the mouthpiece 19. The condensate flow toward the valve orifice will urge the top of the bucket to move toward the valve orifice and to the right as seen in FIG. 4.

During this floating movement, the bucket 18 will first contact the lower part of the valve seat surface 15 at a point indicated along the two-dot chain line depicting the position B of the float. The bucket will then roll on the valve seat surface until it reaches the position A indicated in full line whereupon it will close the valve orifice 14. This action occurs as a result of fluid pressure which has an effect of inducing the floating bucket 18 toward the valve orifice.

The operation described above occurs each time condensate enters the inlet 7. The period of discharge varies depending upon the quantity of condensate flowing into the steam trap. If the flow quantity of condensate is small, the bucket may repeat the swinging motion using the lower part of the valve seat surface 15 as a fulcrum without moving completely out of contact with the valve seat surface 15 thus permitting slow discharge to occur. The trap operates as described above to automatically discharge condensate without escape of steam.

In a steam trap of the type described above, certain problems may arise if the area at which the float 18 abuts the valve seat member is made of stainless steel. As indicated above, during operation of the steam trap, the bucket float 18 rolls about the lower portion of the valve seat surface 15 which acts as a fulcrum each time that the float 18 closes and opens the valve orifice 14. At this time, the bucket float 18 will slide on the valve seat surface 15 and, despite the fact that the distance of this sliding contact may be very small, if the lower portion of the valve seat surface 15 is made of stainless steel, wear will occur and a depression 24 may develop in a relatively short period of time.

If a depression such as the depression 24 reaches the inner edge of the valve seat surface 15, this will prevent the bucket 18 from completely closing the valve orifice 14 even when the bucket 18 is in its uppermost position shown in FIG. 4, and as a result the steam trap will leak steam and its functional integrity will deteriorate.

Thus, the present invention is directed toward providing a structure for the valve seat member 11 which will generally reduce or eliminate such wear and which will extend the life of the steam trap.

An embodiment in accordance with the present invention is depicted in FIG. 1 wherein a valve seat assembly 31 is depicted as including a body portion 32 and an annular member 33. The body 32 is made of stainless steel and has at one end thereof an extended portion 35 which is cylindrical in configuration and which defines therethrough a valve bore 34.

At the other end of the valve body 32 there is provided a portion for connecting the seat assembly 31 with the valve body 1 in a manner similar to that shown in FIG. 4.

As seen in FIG. 1, the annular member 33 surrounds the extended portion 35 through which the valve bore 34 extends. The portion 33 is the portion which will generally be in contact with the float 18 during operation of the steam trap.

In accordance with the invention, the annular member 33 is made of carbide which contains tungsten carbide as the major hard constituent thereof and an alloy consisting mainly of cobalt and nickel as a binder.

The annular member 33 is provided with a recess 36 at the internal peripheral portion thereof and the member 33 is fitted upon the extended portion 35 and affixed thereto by swaging of the inner end of the extended portion 35 so as thereby to fill the recess 36.

After the annular member 33 has been affixed to the body 32 by silver soldering at the contact surfaces therebetween, the outer surface 38 of the annular member 33 is machined with a conical shape. The inner surface of the annular member 33 and the extended portion 35 are ground with a common arrangement to form an annular valve seat surface surrounding the valve orifice defined at the inner end of the bore 34. Silver solder 37 is provided which is an alloy consisting mainly of silver, copper, and zinc.

The float member 18 during operation thereof comes into abutment with a portion of the annular member 33 along a part thereof extending peripherally around the valve orifice. The extended portion 35 defines a valve seat surface 39 through which the valve orifice is defined and the contact of the float with the member 33 occurs at a point peripherally outwardly of the valve seat surface 39.

As the float 18 abuts against the annular member 33, the abutment point will act as a fulcrum and the float 18 will pivot about this point during its movement. Because of the fact that the annular member 33 is made of carbide, the wear which will occur at the abutment portion will be very small due to the wear resistant characteristics of carbide.

When the valve orifice opens, fluid in the valve chamber flows at a high velocity in the vicinity of the valve orifice. However, the inner peripheral portion of the valve orifice in the valve seat surface 39 and the inner wall of the valve bore 34 will be made of stainless steel which exhibits good erosion resistance to the flow.

An alloy consisting mainly of nickel and cobalt is used as a binder for the carbide which compares favorably in erosion resistance to high velocity fluid with conventional alloys consisting mainly of cobalt.

Since the annular member 33 is made completely of carbide and since the member 33 is arranged to completely surround the extended portion 35 through which the bore 34 is defined, the valve seat assembly 31 may be installed into the steam trap housing by a threaded configuration since the rotation which occurs during threading will not prevent abutment of the float 18 with a carbide part of the assembly. Because of the annular configuration of the member 33, the float 18 will always contact a carbide portion despite the fact that the installation requires rotation of the seat assembly 31 since the point of contact will always be made of carbide regardless of the position taken by the seat assembly 31.

The structure depicted in FIG. 1 is relatively easy to manufacture because it is arranged so that the annular member 33 is installed to extend around the extended portion 35. The annular member 33 cannot become loosened because the inner portion of the extended portion 35 is swaged so as to be outwardly expanded in order to fill the recess provided at the inner peripheral portion of the annular member 33.

The member 33 will not rotate when machining the outer surface or during grinding of the surface because it is affixed to the body 32 by means of silver soldering.

The extended portion 35 is integral with the body 32 and is thus easy to produce. Additionally, the reinforcement effect of the annular member 33 provided on the outside of the extended portion 35 prevents damage thereof by collision with the float 18.

Figure 2:
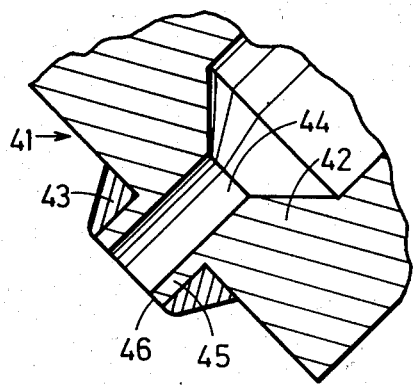
FIG. 2 is a detailed sectional view showing a second embodiment of the invention.

Another embodiment of the invention is depicted in FIG. 2. In the embodiment of FIG. 2, a valve seat assembly 41 is shown as comprising a body portion 42 with an annular member 43 affixed thereto, the annular member 43 being generally similar to the annular member 33 shown in the embodiment of FIG. 1. The body 42 is made of stainless steel and is produced in a manner generally similar to the manner utilized in producing the body 32 of the embodiment depicted in FIG. 1. A valve bore 44 is formed in the body 42 and a cylindrical extended portion 45 defining part of the valve bore 44 is shaped to define at the terminal end thereof a valve seat surface 46.

The annular member 43, as in the case of the embodiment of FIG. 1, is made of carbide, utilizing an alloy consisting primarily of nickel and cobalt as a binder. In this case however, carbide powder is placed around the extended portion 45 and it is sintered by means of metal powder sintering. After that, the outer surface of the member 43 is machined and the valve seat surface 46 is ground.

Compared with the embodiment of FIG. 1, the embodiment of FIG. 2 is considered better suited for mass production because mechanical fixing of the annular member 43 by deformation of the end of the extended portion 46 is unnecessary and utilization of connection means such as silver soldering is also unnecessary.

Figure 3:
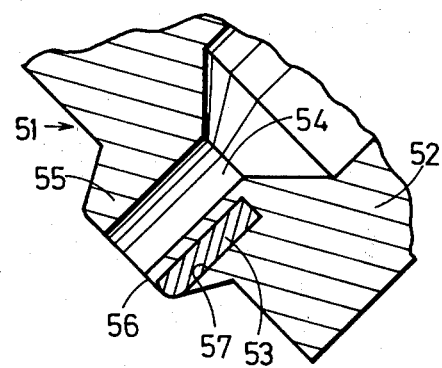
FIG. 3 is a detailed sectional view showing a third embodiment of the invention.

FIG. 3 depicts another embodiment of the invention wherein a valve seat assembly 51 is formed to comprise a body member 52 with a rod or pin 53 embedded therein. The body 52 is made of stainless steel and is produced in a conventional manner similar to that previously described in connection with the previous embodiment. The body member 52 is formed with a conical extended portion 55 and one end thereof is shaped to surround or define a valve bore 54 with the terminal end portion of the conical portion 55 defining adjacent the end of the valve bore 54 a valve seat surface 56.

At the outer periphery of the valve seat surface 56 there is provided a hole 57 within which the pin 53 is inserted. The pin 53 is made of carbide which contains as a binder an alloy consisting primarily of nickel and cobalt. The end of the pin 53 is arranged to be approximately level with the valve seat surface 56.

In the embodiment of FIG. 3, the valve seat assembly 51 is not intended to be installed into the steam trap body by means of a threaded connection as in the case of the embodiment of FIG. 1. Instead, the valve seat assembly 51 of the embodiment of FIG. 3 must be installed by utilizing connection means which will properly position the pin 53. Since rotation of the body member 52 may cause the pin 53 to be improperly located, the preferred means for connecting the body 52 into the steam trap is by use of bolts or other similar means so that the outer end of the pin 53 may be located to act as a fulcrum for the bucket float 18, in a manner previously described in connection with the other embodiments.

As compared with the embodiments of FIGS. 1 and 2, the embodiment of FIG. 3 is easier to produce because it is only necessary to provide a hole 57 in the body member 52 and to insert therein the pin 53.

Additionally, since the extended portion 55 may be formed with a somewhat heavier configuration, a more rugged construction will be provided and less likelihood of damage will occur even if the float member 18 were to impinge against the valve seat surface 56.

The present invention has been found to provide many significant advantages. With the present invention, it is not necessary to form the entire wall which defines the valve bore and the entire valve seat surface of carbide. This provides advantages since, if the parts were made of carbide, the inner edge of the valve seat surface and the inner wall of the valve bore would become eroded in a relatively short period of time due to the high velocity fluid flowing through the valve orifice. This occurs because the binder constituent of the carbide will be washed out by the flowing fluid. Instead, in accordance with the present invention, the inner edge of the valve seat surface and the wall defining the valve bore may be made of stainless steel and consequently good erosion resistance will be provided while at the same time enabling provision of the advantages derived from the utilization of carbide as the float abutment part of the valve seat assembly.

Furthermore, additional advantages arise as compared with prior art devices wherein the fulcrum portion of the valve seat assembly is made separately from the valve seat member and is arranged in the vicinity of the valve orifice. In such devices, disadvantages arise due to the increased number of parts and the difficulty encountered in assembling the parts due to limited space near the valve orifice. In contrast to these prior art arrangements, in the present invention it is only necessary to attach the valve seat assembly into the steam trap casing because part of the valve seat surface operates to constitute the fulcrum point for swinging of the float member.

If wear and a consequent depression occur at the point of contact or at the fulcrum point, greater force is required to operate the valve body. In the case of the present invention, the fulcrum portion is constructed to exhibit the least amount of wear and deformation because of the fact that this portion is made of carbide which is superior in wear resistance. As a result, a steam trap assembly provided with a valve seat assembly in accordance with the present invention will operate more steadily for longer periods of time requiring only the actuating forces for which it was originally designed.

While specific embodiments of the invention have been shown and described in detail to illustrate the application of the inventive principles, it will be understood that the invention may be embodied otherwise without departing from such principles.

What is claimed is:

1. A valve seat assembly for a steam trap including a housing having an interior wall defining a valve chamber, said valve seat assembly being mounted in said housing and defining a valve orifice in flow communication with said valve chamber with a buoyant float member being movably mounted within said valve chamber and adapted to be brought into and out of engagement with said valve seat assembly to close and open said orifice, said valve seat assembly comprising a body portion made of stainless steel mounted within said housing and defining a valve bore having said valve orifice defined at the inner end of said valve bore, a valve seat surface contiguous with and surrounding said valve orifice, and a float abutment member made of carbide located adjacent said valve seat surface on the outer periphery thereof, said float abutment member being located to serve as a contact point for said float member and to define a fulcrum about which said float member may pivot when moving into and out of contact with said valve seat surface.

2. An assembly according to claim 1 wherein the carbide of which said float abutment member is made contains tungsten carbide as a main hard constituent thereof and an alloy consisting mainly of nickel and cobalt as a binder.

3. An assembly according to claim 1 wherein said stainless steel body portion is formed to be connected into said steam trap and to define and extended cylindrical portion integrally therewith, said extended cylindrical portion defining said valve bore with said valve seat surface at the end thereof, said float abutment member being formed with an annular configuration arranged to fit around said extended cylindrical portion.

4. An assembly according to claim 3 wherein said annular float abutment member is formed with a recess at a portion thereof located inwardly of said steam trap and wherein said extended cylindrical portion is shaped to fill said recess in order to firmly mount said annular float abutment member on said extended cylindrical portion.

5. An assembly according to claim 1 wherein said carbide float abutment member is affixed to said body portion of said valve seat assembly by silver soldering.

6. An assembly according to claim 1 wherein said body portion is formed with an extended cylindrical portion defining said valve bore and said valve seat surface at the end of said valve bore, said float abutment member being formed from carbide powder placed around said extended cylindrical portion and sintered by metal powder sintering to form said float abutment portion about said extended cylindrical portion.

7. An assembly according to claim 1 wherein said float abutment member is formed as a carbide pin inserted in a hole provided in said body portion of said valve seat assembly, said hole being located adjacent said valve seat surface and being located so that the end of said carbide pin located at the open end of said hole is arranged to be contacted by said float member and to operate as a fulcrum point for said float member.

* * * * *